UNITED STATES PATENT OFFICE.

GEORGE S. ADAMS, OF BROOKLYN, NEW YORK, ASSIGNOR TO WILLIAM A. HALL, OF BELLOWS FALLS, VERMONT.

CALCIMINE.

SPECIFICATION forming part of Letters Patent No. 525,804, dated September 11, 1894.

Application filed June 12, 1893. Serial No. 477,354. (Specimens.)

*To all whom it may concern:*

Be it known that I, GEORGE S. ADAMS, a citizen of the United States, residing at Brooklyn, in the county of Kings and State of New York, have invented certain new and useful Improvements in Calcimine; and I do hereby declare the following to be a full, clear, and exact description of the invention, such as will enable others skilled in the art to which it appertains to make and use the same.

This invention relates to wall coatings, particularly that class termed calcimines, or water paints.

The purpose of my invention is to produce a cheap compound, one which will cover a large surface in proportion to the quantity used, and one which will not soften with age.

The special object of my improvements is to create a calcimine in which no hot water is used at any time during the formation of the paint.

To carry out my invention I take plaster of paris, as the base, as it is readily obtained, is not high in price, will cover better, and is much whiter than any other similar material. In combination therewith I employ a sizing material, a vegetable one, which consists of waste material obtained from wheat or other analogous grains in the manufacture of starch. This vegetable sizing material is highly nitrogenous and combines the peculiar characteristics that it is readily soluble in cold water; hence can be used in a powdered form and mixed with powdered plaster of paris, while the addition of a small percentage to the base prevents the latter from setting. Hence the introduction of this sizing acts as a preventive to setting and is not a retardent in the sense in which this term is usually employed. In other words the hardening process may aptly be compared to the hardening of oil-paint. Thus the lead constituting the base in oil paints hardens only as the oil is absorbed by the material to which the paint is applied, as likewise by oxidizing or drying action of the air. Similarly this calcimine, as under my invention hardens slowly by absorption and evaporation of the water, and gives the workman ample opportunity to spread it evenly to produce a good effect.

The addition of this vegetable sizing, strongly nitrogenous and soluble in cold water, is of much importance, since the calcimine can thus be applied with equal facility, either in cold or warm weather. Furthermore as the addition of said vegetable sizing prevents setting of the calcimine, it can be applied in places where the ordinary quick setting compound can not be used with any degree of success, since if air currents are present streaks and water lines frequently appear and mar the effect.

This glutinous material fulfills a threefold purpose, to wit:—(a) It produces a plaster coating of such quality that it will not rub off. (b) It changes the spreading covering capacity of the plaster to a great extent. It makes it spread smooth and cover evenly. (c) A slight fraction of a per cent. prevents the plaster from setting.

In compounding this calcimine I use the proportions of ninety three parts of plaster of paris to about seven parts of vegetable sizing, with sufficient water to enable the paint to be readily applied with a brush. If a single coating is to be used as for mill or store service, less water is added as greater consistency is required. Conversely for interiors or on wall finish in dwellings or apartments, more water may be added and two or more coats applied with the result that a higher finish is obtained.

What I claim is—

1. A calcimine, composed of cold water, plaster of paris, and nitrogenous vegetable sizing made from wheat gluten in the manufacture of starch and soluble in cold water, substantially in the proportions and for the purposes set forth.

2. A calcimine consisting of powdered plaster of paris, powdered nitrogenous vegetable sizing as a preventive of setting, and cold water to give the requisite consistency, as specified.

In testimony whereof I affix my signature in presence of two witnesses.

GEORGE S. ADAMS.

Witnesses:
WM. A. HALL,
S. N. ALEXANDER, Jr.